Feb. 25, 1941.　　　B. W. JONES　　　2,233,169
CONTROL SYSTEM
Filed March 28, 1940　　　2 Sheets-Sheet 1

Inventor:
Benjamin W. Jones,
by　*Wally E. Denham*
His Attorney.

Patented Feb. 25, 1941

2,233,169

UNITED STATES PATENT OFFICE 2,233,169

CONTROL SYSTEM

Benjamin W. Jones, Schenectady, N. Y., assignor to General Electric Company, a corporation of New York Application March 28, 1940, Serial No. 326,405

5 Claims. (Cl. 172—179)

This invention relates to control systems, more particularly to systems for controlling the starting, accelerating, and stopping operations of an electric motor, and it has for an object the provision of a simple, reliable, and improved control system of this character.

A further object of the invention is the elimination of a number of relays heretofore used for controlling the accelerating and reverse current braking contactors.

A still further object of the invention is the provision of a control system of this character in which standard contactors with the addition of a few simple parts may be employed.

In carrying the invention into effect in one form thereof, a resistor having a portion for limiting the current during reverse current braking, and a portion for limiting the current during acceleration which is adapted to be connected in the armature circuit of an electric motor is provided, together with a contactor for controlling the braking portion and a contactor for controlling the accelerating portion. A master switch and means controlled thereby are provided for connecting the motor to a source for rotation in either direction. The braking contactor and the accelerating contactor each have two core members arranged end to end in axial alignment with a main pickup coil on one of the cores and a restraining coil on the other core. An armature member is pivotally mounted to be attracted by the core carrying the main coil, and a magnetic member is attached to the other core and extends into contact with the armature thereby to restrain the armature against attraction by the main coil when the restraining coil is energized. The main operating coils of both contactors and the restraining coil of the accelerating contactor are arranged to be connected to a source, and energized in response to operation of the master switch, but the restraining coil of the braking contactor is connected to the armature circuit of the motor so as to be responsive to an electrical operating condition thereof. During reverse current braking operation of the motor, the restraining coil of the braking contactor prevents operation of the contactor and, thereafter permits the main coil to operate the contactor to render the braking portion of the resistor ineffective and to interrupt the connections of the restraining coil of the accelerating contactor so that the accelerating contactor can operate after a predetermined interval of time to render the accelerating portion of the resistor ineffective.

Figure 1:
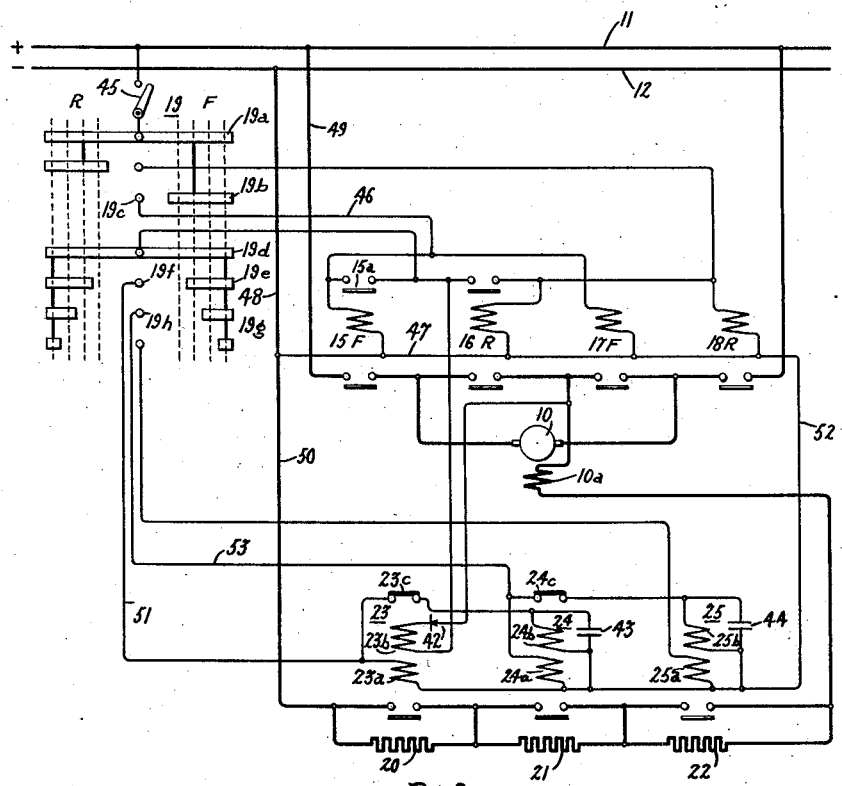
Figure 3:
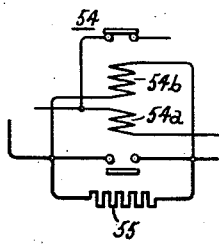
Figure 2:
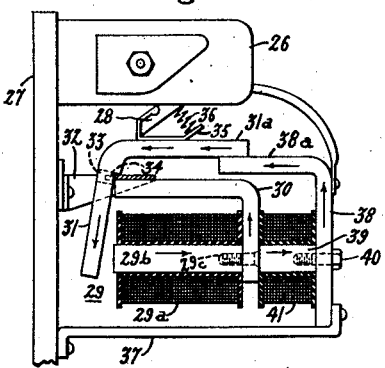
Figure 4:
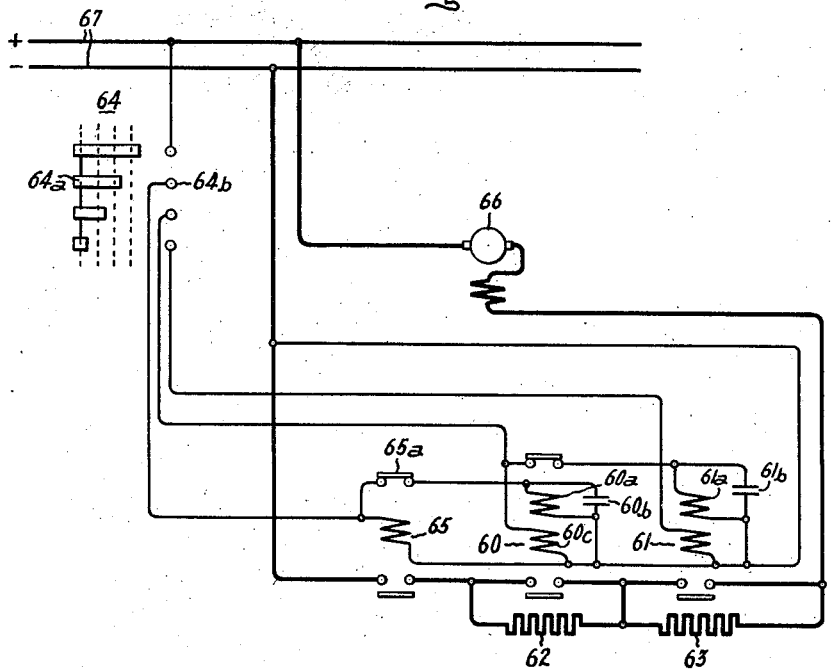

For a better and more complete understanding of the invention, reference should now be had to the following specification and to the accompanying drawings in which Fig. 1 is a simple, diagrammatical representation of an embodiment of the invention, Fig. 2 shows a detail, and Figs. 3 and 4 are modifications.

Referring now to the drawings, an electric motor 10 is supplied from a suitable source represented in the drawings by the two supply lines 11 and 12, to which the motor may be connected for rotation in either direction by suitable reversing switching mechanism illustrated as comprising contactors 15, 16, 17, and 18. These reversing contactors are controlled by means of a multiposition reversing type master switch 19 having a central or "off" position in which it is illustrated and a plurality of "forward" and a plurality of "reverse" operating positions.

For the purpose of limiting the motor armature current to safe values, suitable current limiting means are provided which are illustrated as a resistor having a portion 20 for limiting the current during the reverse current braking operation and additional portions 21 and 22 for limiting the motor current during starting and acceleration of the motor. The inclusion of these resistor portions in the armature circuit and the short circuiting of these portions are effected by suitable means such as electromagnetic contactors 23, 24, and 25. The contactor 23 which controls the braking portion 20 of the resistor is referred to as the braking contactor and is also known in the art as the "plugging" contactor. The term "plugging" has the same meaning as the expression "reverse current braking." The contactors 24 and 25 which control the accelerating portions 21 and 22 of the resistor are known as accelerating contactors.

The structure of the braking and accelerating contactors is illustrated in Fig. 2, in which the stationary contact element (not shown) is mounted within the arc chute 26 on the supporting base 27. The movable contact element 28 is biased by gravity to the open position in which it is shown. An operating electromagnet 29 comprising an operating coil 29a and a stationary magnetic structure which includes the core 29b and the L-shaped magnetic return member 30 is provided for attracting the magnetic member or armature 31 upon which is mounted the movable contact member and thereby operating the movable contact member into contacting engagement with the corresponding stationary contact member.

The several individual parts of electromagnet 29 are supported in operative relationship by two spaced supports 32, each of which has one end fixed to the supporting base 27. The armature 31 is bent intermediate its ends into an L shape as shown in the drawings, and is provided near the bend with opening 33 for loosely engaging a portion 34 of the support so as to be rotatably supported thereby with a bias toward base 27 owing to the overhanging bent leg 31ₐ. Upon the free ends of the supports 32 the end of one leg of the L-shaped magnetic return member 30 is secured by suitable means. The core 29ᵦ upon which the operating coil 29ₐ is disposed is joined to an intermediate portion of the other leg of member 30 by a screw 29c. The movable switch element comprises the supporting member 35, spring 36, and the contact member (not shown) which is disposed behind arc chute 26.

The contactor as thus far described is obtainable on the market and consequently it is not necessary to purchase expensive new tools for fabricating this portion of the contactor. The portion thus far described, however, lacks the necessary structure and function to attain the desired objects of the invention.

An additional supporting frame member or brace 37 is secured to base 27. To this frame member 37 is secured an L-shaped magnetic frame member 38. To one arm of L-shaped member 38 a core member is secured by means of a screw 40. The screw 29c may be an extension of core 39 and thus core 39 may be considered as the head of bolt 29c. Core 39 is mounted on member 38 so that it is disposed end to end and in axial alignment with core member 29ᵦ.

The other arm of magnetic member 38 extends parallel with core member 39 so as to form a stop for armature member 31 when arm 31ₐ of the armature member comes into contact therewith. An auxiliary coil 41 is disposed on the core member 39. The coil 41 has fewer ampere turns than the coil 29ₐ. In one application, for example, coil 29ₐ has 2000 ampere turns and coil 41 has 1000 ampere turns.

The coils 29ₐ and 41 may be connected either to aid each other or to oppose each other. Assuming the coils to be energized so as to aid each other, the magnetic fluxes take the directions in the magnetic members indicated by the arrows. Since the reluctance between arms 38ₐ and 31ₐ which are in contact with each other is very considerably less than reluctance of the air gap between armature 31 and core member 29ᵦ, the flux produced by coil 41 restrains the armature against attraction by core member 29ᵦ. The force of attraction of the two arms 31ₐ and 38ₐ is much greater than required to withstand the attraction of armature 31 by core member 29ᵦ, and consequently the armature is restrained against attraction by core member 29ᵦ until the energization of coil 41 is reduced to a very low value.

In the embodiment illustrated in Fig. 1 the reverse braking contactor 23 and accelerating contactors 24 and 25 are the same as shown in Fig. 2 and described in the foregoing. The operating coils 23ₐ, 24ₐ, and 25ₐ of these contactors are connected to be successively energized in response to actuation of the master switch 19 to its successive operating positions either "forward" or "reverse." The restraining coil 23ᵦ of the reverse current braking contactor is connected across the reversing contactors so as to be responsive to the armature voltage of the motor. A rectifier 42 is included in the connections to the restraining coil 23ᵦ for the purpose of preventing current from flowing through the restraining coil when the motor is stopped or when it is accelerating.

As shown, the restraining coil 24ᵦ of accelerating contactor 24 is connected through a normally closed interlock 23c on the braking contactor to the master switch so as to be energized when the master switch is operated to its first running position either forward or reverse. Similarly, the restraining coil 25ᵦ is connected through a normally closed interlock 24c on accelerating contactor 24 so as to be energized when the master switch is moved to its second running position.

In order to interpose a time delay between the closing of the braking contactor and the closing of accelerating contactor 24, an energy storage device, illustrated as a capacitor 43, is connected in parallel with restraining coil 24ᵦ. Similarly, a capacitor 44 is connected in parallel with the restraining coil 25ᵦ for the purpose of interposing a time delay between the closing of accelerating contactors 24 and 25.

With the foregoing understanding of the elements and their organization in the complete system, the operation of the system itself will readily be understood from the following detailed description.

The main switch 45 is closed to connect the power segment 19ₐ to the positive side of the source. With the master switch in the central or "off" position in which it is shown, the parts will be in the positions in which they are illustrated in the drawings.

Operation of the master switch to the first running position "forward" completes a circuit for the operating coils of the forward contactors 15 and 17. This circuit is traced from segment 19ₐ to segment 19ᵦ and cooperating finger 19c of the master switch through conductor 46, operating coils of contactors 15 and 17 in parallel and thence by conductors 47 and 48 to the negative side 12 of the source. Contactors 15 and 17 close in response to energization of their operating coils and connect the motor armature to the source for rotation in the forward direction. Contactor 15 also closes its interlock 15ₐ to complete a circuit from segment 19ᵦ to segment 19d of the master switch. All of the segments below 19d are connected to segment 10d, which is connected to the positive side of the source, and thus may be considered as the positive side of the source.

The motor armature circuit at this point in the operation is traced from the positive side of the source through conductor 49, main contacts of contactor 15, armature of motor 10, main contacts of contactor 17, series field winding 10ₐ, resistors 22, 21, and 20 in series and thence by conductor 50 to negative side of the source. On account of the full amount of resistance being connected in the armature circuit, the motor begins to rotate slowly.

Since the lower terminal of restraining coil 23ᵦ is connected to the positive side of the source, current flow through the coil is prevented by rectifier 42, and the coil is unable to prevent the contactor from being closed by the main operating coil 23ₐ on the second point of the master switch.

Movement of the master switch to its second position forward also completes an energizing circuit for the restraining coil 24ᵦ of accelerating contactor 24. This circuit is traced from segment 19e of the master switch and cooperating finger 19f through conductor 51, normally closed interlock 23c on the reverse current braking contactor, restraining coil 24b, and thence by conductors 52 and 48 to the negative side of the source. Capacitor 43 which is connected in parallel with restraining coil 24b is immediately charged as a result of the direct current voltage which is applied thereto.

An energizing circuit is also completed for the main operating coil 23a of the reverse current braking contactor. Since the restraining coil of this contactor is not energized, the contactor closes its main contacts to short-circuit the braking resistor 20 and also opens its interlock 23c to disconnect restraining coil 24b and its parallel connected capacitor 43 from the source. The speed of the motor increases as a result of the short circuiting of the braking resistor 20 which contains a large percentage of the total resistance of the circuit. Since the restraining coil of the braking contactor is not energized when starting from rest, the length of time that the braking resistor is in circuit after the master switch reaches its second running position is insignificant and thus does not interfere with proper starting operation.

Movement of the master switch to the third position "forward" completes an emergency circuit for the restraining coil 25b of contactor 25, which is traced from segment 19g and cooperating finger 19h, through conductor 53, interlock 24c of contactor 24, coil 25b and conductors 52 and 48 to the negative side of the source. Capacitor 44 which is connected in parallel with coil 25b is immediately charged. Movement of the master switch to the third running position also completes an energizing circuit for the main operating coil 24a of the first accelerating contactor. However, this contactor cannot be closed for a predetermined interval of time after the short circuiting of the braking resistor 20 by contactor 23, because the capacitor 43 discharges through restraining coil 24b when the interlock 23c opens. As a result, restraining coil 24b is maintained sufficiently energized to prevent closing of the contactor. After a predetermined interval of time which is required for the current in the circuit of the capacitor and coil to decay to a value at which the effect of the restraining coil is overcome by the main operating coil, the contactor closes its main contacts to short-circuit accelerating resistor 21. As a result of the short circuiting of resistor 21, the speed of the motor is further increased.

Contactor 24 in closing its main contacts opens its interlock contacts 24c to disconnect restraining coil 25b and its parallel connected capacitor 44 from the source thereby causing the capacitor 44 to discharge through restraining coil 25b. Movement of master switch 19 to its fourth running position completes an energizing circuit for the operating coil 25a of the second accelerating contactor, but the discharge of capacitor 44 through restraining coil 25b prevents the contactor from picking up and short-circuiting the last accelerating section for a predetermined interval of time after the short circuiting of section 21.

Assume now that it is desired to stop the motor quickly or to reverse its direction of rotation quickly. This may be accomplished by throwing the master switch from its fourth running position "forward" to any of its running positions "reverse." An operator usually performs this operation in a single movement by throwing the master switch handle from the full speed "forward" position to the full speed "reverse" as rapidly as it is possible for him to do so.

As the master switch is moved back through its "forward" running positions the accelerating contactors and the reverse current braking contactor are dropped out and resistors 20, 21 and 22 reinserted in the armature circuit of the motor. In the central or off position, the directional contactors 15 and 17 are opened, and in the first position "reverse" directional contactors 16 and 18 are closed. As a result of the closing of contactors 16 and 18 the motor armature which is rotating at full speed in the forward direction is connected to the source for rotation in the reverse direction. When the armature was connected to the source for rotation in the forward direction, its counter voltage opposed the voltage of the source. Since the connection of the armature to the source is now reversed, the armature voltage adds to the voltage of the source so that 200 per cent of line voltage is applied across resistors 20, 21 and 22. The closing of contactors 16 and 18 also reverses the connections of restraining coil 23b of the reverse braking contactor to the armature with the result that the rectifier 42 becomes conducting and the restraining coil 23b is energized and prevents the main operating coil 23a from closing to short-circuit the reverse current braking portion 20 of the resistor when the master switch reaches the second running position "reverse."

The reversal of the armature connections to the source reverses the direction of the current in the armature, but the direction of current flow through the series field winding 10a remains the same as before. Consequently, the torque of the motor is reversed and is of large value owing to the large armature current which results from the adding of the armature voltage to the voltage of the source. As a result, this heavy reverse torque rapidly brakes the motor to standstill.

As the speed of the motor decreases, its counter voltage decreases and at a predetermined low value of the counter voltage, the restraining effect of restraining coil 23b is overcome by the main coil and the contactor closes to short-circuit the braking section 20 of the resistor. The speed of the motor decreases to zero and the motor then starts to rotate in the reverse direction. From this point, the operation in the reverse direction is the same as that described for the forward direction.

The modification of Fig. 3 is the same as the modification of Fig. 1 except for the method of controlling the reverse current braking contactor 54. The main operating coil 54a of this contactor is controlled in the same manner as operating coil 23a in the Fig. 1 modification, but the restraining coil 54b is connected across the reverse current braking portion 55 of the resistor. Thus the excitation restraining coil is determined by the voltage drop across the reverse current braking section and when this excitation is above a predetermined value, as when the motor is undergoing reverse current braking, the main operating coil cannot close the braking contactor.

It will be clear that the restraining coils of the contactors can be connected so that their fluxes oppose the fluxes of the main operating coils. This results in decreasing the time delay as compared with the time delay of the contactor shown in Fig. 2 in which the fluxes of the two coils add.

A non-reversing starter is disclosed in the modification of Fig. 4. In this modification the accelerating switches 60 and 61 which short circuit resistors 62 and 63 are in all respects identical with the switches 24 and 25 of the modification of Fig. 1.

The operation is as follows: Movement of the master switch 64 to its first position completes an energizing circuit for the restraining coil 60a of accelerating contactor 60, and the capacitor 60b which is connected in parallel is quickly charged. This circuit is traced from the master switch segment 64a and cooperating finger 64b through normally closed interlock 65a of the line contactor, through coil 60a and capacitor 60b in parallel and thence to the negative side of source 67. Also the operating coil of line contactor 65 which is in parallel with coil 60a is energized and the contactor closes its lower main contact to connect motor 66 to the source with resistors 62 and 63 in series. As a result the motor begins to rotate.

Movement of the master switch 64 to its second position energizes the operating coil 60c of accelerating contactor 60.

In the closed position of line contactor 65, the interlock 65a is opened to disconnect restraining coil 60a of the accelerating contactor and the capacitor 60b from the source. However, the accelerating contactor 60 does not close immediately even though the master switch has reached its second position because the capacitor 60b after being disconnected from the source discharges through the restraining coil 60a and thus maintains the restraining coil sufficiently energized to prevent the operating coil 60c from closing the main contacts. After a predetermined interval of time the discharge rate of the capacitor decays to a value such that the operating coil is able to overcome the pull of the restraining coil and close the contacts to short circuit resistor 62. As a result, the speed of motor 66 is further increased.

In a similar manner, the contactor 61 may be closed in response to movement of the master switch to its third position. The capacitor 61b which is connected in parallel with restraining coil 61a serves to interpose a time interval between the closing of contactor 61 and the closing of contactor 60 in a manner similar to that already described. The closing of contactor 61 to short circuit resistor 63 accelerates the motor to full speed.

Although in accordance with the provisions of the patent statutes, this invention is described as embodied in concrete form and the principal thereof has been explained together with the best mode in which it is now contemplated applying that principle, it will be understood that the elements and connections shown are merely illustrative, and that the invention is not limited thereto, since alterations and modifications will readily suggest themselves to persons skilled in the art without departing from the true spirit of this invention or from the scope of the annexed claims.

What I claim as new and desire to secure by Letters Patent of the United States is:

1. A system for controlling the operation of electric motors comprising a resistor arranged to be connected in the armature circuit of a motor, said resistor having a portion for limiting the armature current during reverse current braking operation of the motor and a portion for limiting the armature current during acceleration of said motor, a master switch and means controlled thereby for connecting the motor to a source for rotation in either direction, a first electromagnetic switching device for controlling said braking portion, a second electromagnetic switching device for controlling said accelerating portion, each of said switching devices comprising a pair of core members arranged end to end in axial alignment, a main operating coil mounted on one of said cores, an auxiliary coil mounted on the other of said cores, an armature member pivotally mounted to be attracted by the core carrying said operating coil, a magnetic member secured to the core carrying said auxiliary coil extending into contact with said armature in its unattracted position so that said auxiliary coil when energized acts to restrain said armature against attraction by said main coil, the auxiliary coil of said first switching device being connected to be responsive to an operating condition of said motor to prevent said first switching device from rendering said braking portion of said resistor inactive during reverse current braking operation of said motor, connections controlled by said master switch for connecting said operating coils and the auxiliary coil of said second switching device to a source, an energy storage device connected in parallel with said last mentioned auxiliary coil, and means responsive to operation of said first mentioned switching device for disconnecting the auxiliary coil of said second switching device and said energy storage device from said source so that said energy storage device maintains said auxiliary coil energized for an interval of time thereby to prevent said second switching device from rendering said accelerating portion inactive for a predetermined interval of time after operation of said first switching device.

2. A system for controlling the operation of electric motors comprising a resistor arranged to be connected in the armature circuit of an electric motor, said resistor having a portion for limiting the armature current during reverse current braking operation of the motor and a portion for limiting the armature current during acceleration of the motor, a master switch and means controlled thereby for connecting the motor to a source for rotation in either direction, a first electromagnetic switching device for controlling said braking portion of said resistor, said switching device having a main operating coil controlled by said master switch and a restraining coil connected to be responsive to the voltage drop across said braking portion of said resistor to prevent operation of said switching device by said main coil to render said braking portion of said resistor ineffective while the armature current exceeds a predetermined value, a second electromagnetic switching device for controlling said accelerating portion of said resistor, said second switching device having a main operating coil controlled by said master switch and a restraining coil arranged to be connected to a source by said master switch to prevent operation of said second switching device to render said accelerating portion of said resistor ineffective, means responsive to operation of said first switching device for disconnecting said last mentioned restraining coil from said source, and an energy storage device connected in parallel with said last mentioned restraining coil to discharge through said restraining coil to maintain said restraining coil energized for a predetermined interval of time thereby to prevent operation of said second switching device to render said accelerating portion ineffective for a predetermined interval of time after operation of said first switching device.

3. A system for controlling the operation of an electric motor comprising a resistor arranged to be connected in the armature circuit of the motor, said resistor having a plurality of portions, one portion for limiting the armature current of the motor during reverse current braking and the remaining portions for limiting the armature current during acceleration of the motor, a multiposition master switch and means controlled thereby for connecting the motor to a source for rotation in either direction, a contactor for controlling said braking portion, and a separate contactor for controlling each of said accelerating portions, each of said contactors comprising a pair of core members arranged end to end in axial alignment, a main operating coil mounted on one of said cores, a restraining coil mounted on the other of said cores, an armature member pivotally mounted to be attracted by the core carrying said operating coil, a magnetic member secured to the core carrying said restraining coil and extending into contact with said armature in its unattracted position so that said restraining coil when energized acts to restrain said armature against attraction by said main coil, a capacitor connected in parallel with the restraining coil of each of said accelerating contactors, connections controlled by said master switch for connecting said main operating coils and the restraining coils of said accelerating contactors to a source, connections from the restraining coil of said braking contactor to said braking resistor whereby said braking contactor is prevented from rendering said braking resistor inactive until the current in said resistor decreases to a predetermined value, and an interlock actuated by operation of said braking contactor for interrupting the connections between the restraining coil of one of said accelerating contactors and said source to provide for operation of said accelerating contactor to render an accelerating portion of said resistor inactive after an interval of time determined by the rate of discharge of the parallel connected capacitor through said restraining coil.

4. A system for controlling the operation of an electric motor comprising in combination, an electric motor, a resistor adapted to be connected in the armature circuit of said motor, said resistor having a portion for limiting the armature current during reverse current braking operation of said motor and a portion for limiting the armature current during acceleration of the motor, a multiposition reversing type master switch and reversing contactors controlled thereby for connecting the motor to a source for rotation in either direction, a contactor for controlling said braking portion, said contactor having a restraining coil connected across the armature of said motor and a main operating coil having connections to a source arranged to be completed by operation of said master switch, a rectifier connected in circuit with said restraining coil whereby said coil is energized only during reverse current braking operation of said motor and said main coil is thereby prevented from rendering said braking portion of said resistor ineffective during said braking operation, a second contactor for controlling said accelerating portion provided with a main operating coil and a restraining coil having a capacitor connected in parallel therewith, connections from said coils to a source completed in response to operation of said master switch, and an interlock operable in response to operation of said braking contactor for interrupting the connections from said last mentioned restraining coil to said source thereby to cause the capacitor connected in parallel therewith to discharge through said restraining coil and maintain said restraining coil energized to prevent operation of said accelerating contactor by said main coil to render said accelerating portion of said resistor ineffective for a predetermined interval of time after operation of said braking contactor.

5. A system for controlling the operation of an electric motor comprising a resistor arranged to be connected in the armature circuit of the motor for limiting the current during acceleration of the motor, a master switch and a first contactor controlled thereby for controlling the motor armature circuit, a second contactor for controlling said resistor, said second contactor comprising a pair of core members arranged end to end in axial alignment, a main operating coil mounted on one of said cores, a restraining coil mounted on the other of said cores, an L-shaped armature member pivotally mounted so that one leg extends past the face of the core carrying said operating coil so as to be attracted thereby and the other leg extends along said core member toward the core member carrying said restraining coil, a magnetic member secured to the core carrying said restraining coil and extending into contact with said other leg of said armature when in its unattracted position so that said restraining coil when energized acts to restrain said armature against attraction by said main coil, a capacitor connected in parallel with said restraining coil, connections controlled by said master switch for connecting the operating coil of said first contactor and the operating coil and restraining coil of said second contactor to a source, and an interlock actuated by operation of said first contactor for interrupting the connections between the restraining coil of said accelerating contactor and said source to provide for operation of said second contactor to short circuit said resistor after an interval of time determined by the rate of discharge of the parallel connected capacitor through said restraining coil.

BENJAMIN W. JONES.